United States Patent
Toohey et al.

(10) Patent No.: US 8,651,378 B2
(45) Date of Patent: *Feb. 18, 2014

(54) SYSTEM AND METHOD FOR MONITORING A VALIDATOR

(75) Inventors: Tony Toohey, North Ryde (AU); David Jack, North Ryde (AU)

(73) Assignee: Ebet LTD., North Ryde NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,875

(22) Filed: Jun. 29, 2012

(65) Prior Publication Data

US 2012/0267433 A1 Oct. 25, 2012

Related U.S. Application Data

(63) Continuation of application No. 12/876,159, filed on Sep. 5, 2010, now Pat. No. 8,231,052, which is a continuation of application No. 11/359,993, filed on Feb. 21, 2006, now Pat. No. 7,789,294.

(30) Foreign Application Priority Data

Feb. 18, 2005 (AU) ................................ 2005900774

(51) Int. Cl.
*G06F 7/08* (2006.01)
*G06F 5/00* (2006.01)
*G06Q 40/00* (2012.01)
*G07D 11/00* (2006.01)
*G07F 19/00* (2006.01)
*G06K 7/00* (2006.01)
*G07C 3/00* (2006.01)
*G07F 9/02* (2006.01)
*A63F 9/24* (2006.01)
*A63F 13/00* (2006.01)
*G06F 17/00* (2006.01)
*G06F 19/00* (2011.01)

(52) U.S. Cl.
USPC ........... 235/382; 235/379; 235/381; 235/380; 235/435; 705/43; 194/200; 463/29

(58) Field of Classification Search
USPC .............. 235/379–381, 435, 382; 705/43–44, 705/64–67, 75, 73; 713/159, 172, 183, 185; 463/1, 25, 29; 902/8, 30, 31, 23; 194/200

See application file for complete search history.

(56) References Cited

U.S. PATENT DOCUMENTS

| | | | | | |
|---|---|---|---|---|---|
| 4,347,925 | A | * | 9/1982 | Sugimoto et al. | 194/200 |
| 4,420,751 | A | * | 12/1983 | Paganini et al. | 705/43 |
| 5,239,166 | A | * | 8/1993 | Graves | 235/380 |
| 5,902,983 | A | * | 5/1999 | Crevelt et al. | 235/380 |

(Continued)

*Primary Examiner* — Daniel Walsh

(74) *Attorney, Agent, or Firm* — Christopher R. Carroll; The Small Patent Law Group LLC

(57) ABSTRACT

A system for monitoring a validator that assesses a token includes an input device for receiving messages from a machine including a validator. The messages contain data indicative of validator events such as an assessment of a token resulting in acceptance of the token and an assessment of a token resulting in rejection of the token. The system further includes a processor for deriving timing information for the validator events and for comparing the data and timing information with predetermined criteria. Personnel alerts are raised when predetermined criteria are satisfied, and maintenance of validators may be scheduled in dependence upon criteria related to assessments of tokens resulting in rejection.

14 Claims, 9 Drawing Sheets

(56) References Cited

U.S. PATENT DOCUMENTS

| | | | |
|---|---|---|---|
| 5,917,913 A * | 6/1999 | Wang | 705/67 |
| 6,056,194 A * | 5/2000 | Kolls | 235/381 |
| 6,564,997 B1 * | 5/2003 | Juds | 235/382 |
| 7,789,294 B2 * | 9/2010 | Toohey et al. | 235/379 |
| 8,000,990 B2 * | 8/2011 | Pace et al. | 705/7.12 |
| 8,231,052 B2 * | 7/2012 | Toohey et al. | 235/382 |
| 2002/0013679 A1 * | 1/2002 | Petite | 702/188 |
| 2002/0058550 A1 * | 5/2002 | Pace et al. | 463/42 |
| 2002/0082994 A1 * | 6/2002 | Herziger | 705/43 |
| 2003/0078039 A1 * | 4/2003 | Grossi et al. | 455/423 |
| 2003/0100369 A1 * | 5/2003 | Gatto et al. | 463/42 |
| 2003/0135470 A1 * | 7/2003 | Beard | 705/67 |
| 2003/0148812 A1 * | 8/2003 | Paulsen et al. | 463/42 |
| 2003/0213839 A1 * | 11/2003 | Riggert et al. | 235/375 |
| 2004/0050927 A1 * | 3/2004 | Nozaki et al. | 235/379 |
| 2004/0056086 A1 * | 3/2004 | Mason et al. | 235/379 |
| 2005/0035197 A1 * | 2/2005 | Brusso et al. | 235/381 |
| 2005/0059485 A1 * | 3/2005 | Paulsen et al. | 463/29 |
| 2005/0173515 A1 * | 8/2005 | Sawa | 235/379 |
| 2005/0263583 A1 * | 12/2005 | Schlabach et al. | 235/379 |
| 2005/0263585 A1 * | 12/2005 | Schlabach et al. | 235/379 |
| 2006/0059047 A1 * | 3/2006 | Cardone et al. | 705/14 |
| 2006/0180652 A1 * | 8/2006 | Meek et al. | 235/379 |
| 2006/0191997 A1 * | 8/2006 | Toohey et al. | 235/379 |
| 2006/0217195 A1 * | 9/2006 | Walker et al. | 463/29 |
| 2007/0033068 A1 * | 2/2007 | Rao et al. | 705/2 |
| 2007/0078787 A1 * | 4/2007 | Mersky et al. | 705/75 |
| 2007/0152034 A1 * | 7/2007 | Dietz et al. | 235/379 |
| 2008/0046334 A1 * | 2/2008 | Lee et al. | 705/26 |
| 2008/0077532 A1 * | 3/2008 | Von Heesen et al. | 705/67 |
| 2008/0274795 A1 * | 11/2008 | Carpenter et al. | 463/25 |
| 2009/0114719 A1 * | 5/2009 | Schlabach et al. | 235/379 |
| 2009/0209326 A1 * | 8/2009 | Okada | 463/25 |
| 2009/0236200 A1 * | 9/2009 | Hallowell et al. | 194/215 |
| 2009/0320106 A1 * | 12/2009 | Jones et al. | 726/5 |
| 2010/0012719 A1 * | 1/2010 | Meek et al. | 235/379 |
| 2010/0042541 A1 * | 2/2010 | Kang et al. | 705/42 |
| 2010/0327053 A1 * | 12/2010 | Toohey et al. | 235/375 |
| 2011/0042403 A1 * | 2/2011 | Martin | 221/1 |
| 2011/0191243 A1 * | 8/2011 | Allen | 705/43 |
| 2011/0270695 A1 * | 11/2011 | Jones et al. | 705/18 |
| 2012/0005073 A1 * | 1/2012 | Gnorski | 705/39 |
| 2012/0084210 A1 * | 4/2012 | Farahmand | 705/64 |
| 2012/0267433 A1 * | 10/2012 | Toohey et al. | 235/382 |

* cited by examiner

SYSTEM AND METHOD FOR MONITORING A VALIDATOR

CROSS-REFERENCE TO RELATED APPLICATIONS

This application is a continuation of U.S. application Ser. No. 12/876,159, which was filed on 5 Sep. 2010 (the "'159 Application"). The '159 Application is a continuation of U.S. Pat. No. 7,789,294, which was filed on 21 Feb. 2006 (the "'294 Patent"). The '294 Patent is a national priority application from AU2005900774, which was filed on 18 Feb. 2005. The entire disclosures of the '159 Application and the '294 Patent are incorporated by reference into this application.

TECHNICAL FIELD

The inventive subject matter described herein relates to a system for monitoring a validator for assessing a token and methods for monitoring a network of machines including such a validator.

At least one embodiment of the inventive subject matter has been developed for use with electronic gaming machines (EGMs) and it will be described hereinafter primarily with reference to this application. It will be appreciated, however, that the inventive subject matter is not limited to this particular field of use. In particular, the inventive subject matter also finds application in the fields of vending machines and systems for controlling access to a location, a resource, or an account.

BACKGROUND

Any discussion of the prior art throughout the specification should in no way be considered as an admission that such prior art is widely known or forms part of common general knowledge in the field.

EGMs which allow a user to play a game upon purchase of credit are known. Such EGMs generally include a validator for assessing token of some description, which is presented or inserted by a user to effect payment for credit. The token may be a banknote or a coin inserted into the machine, for example. In such cases, the inserted currency must be assessed to ensure that it is not counterfeit or foreign currency. In other cases, the token may be a card having a magnetic strip or a chip, or it may be a radio frequency (RFID) tag identifying a particular user or a user account. In such cases, the token must be assessed to ensure that it is of a type that may be used to purchase credit.

Various devices exist to perform this assessment: coin acceptors assess coins; bill validators assess banknotes; and card and tag readers read cards and RFID tags. Except where a more limited construction is clearly intended, the term "validator" in this document includes any device for assessing a token used to obtain credit for, or access to functionality of, a machine, or access to a location, a resource, or an account.

It is known for validators to store status information indicative of, for example, the number of assessments performed and the number of tokens accepted/rejected. This information is accessible by maintenance or other personnel for determining whether maintenance of the validator is necessary.

BRIEF DESCRIPTION

It is an object of the present invention to overcome or ameliorate at least one of the disadvantages of the prior art, or to provide a useful alternative.

According to a first aspect of the invention there is provided a system for monitoring a validator that assesses a token the system including:

an input device for receiving messages from a machine including a validator, the messages containing data indicative of validator events;

a processor for deriving timing information for the validator events and for comparing the data and timing information with predetermined criteria.

Preferably, the processor derives the timing information by extracting timestamp information from the messages.

Preferably, the processor derives the timing information with reference to the time of receipt of the messages by the input device.

In the preferred embodiment, the input device is adapted to receive messages indicative of the following validator events:

an assessment of a token resulting in acceptance; and an assessment of a token resulting in rejection.

However, the input device may also be adapted to receive messages indicative of the following additional validator events:

removal of a token storage device for storing accepted tokens; and acceptance and storage of a token resulting in a token storage device being full.

Preferably, the processor is adapted to determine occasions when an assessment of a token resulting in rejection is followed by a period of greater than a predetermine duration without an assessment resulting in rejection or an assessment resulting in acceptance. Such occasions are hereinafter referred to as "walk-away events".

In such cases, the predetermined criteria preferably include the criterion that a walk-away event has occurred.

Preferably, the criteria include the criterion that a number of assessments resulting in rejection exceeds a predetermined threshold number.

For example, the number of assessments resulting in rejection may be the number of assessments resulting in rejection occurring within a predetermined window. The predetermined window is preferably a predetermined number of consecutive assessments. Alternatively, the predetermined window may be the most recent m assessments, where m is a predetermined number or a predetermined time interval.

Preferably, for each assessment resulting in acceptance, the message includes data identifying a type of the token.

The criteria preferably includes the criterion that the proportion of assessments resulting in acceptance of a particular type of token falls below a second predetermined threshold.

For each assessment resulting in rejection, the message preferably includes data indicative of a reason for rejection.

In a preferred embodiment, the processor outputs a signal when at least one of the criteria is satisfied; and an output device is provided which is responsive to the signal for outputting an alert signal.

The alert signal is preferably output to an alert device adapted to attract the attention of an operator. The alert device may include, for example, a pager device, a mobile telephone, a public address system or a computer.

Preferably, the criteria includes the criterion that a "token store full" event message or a "token store removal" is received.

The system preferably includes a collating device for collating received data, for example in the form of a SQL database.

Preferably, the input device is adapted to receive messages from a plurality of validators included in respective machines and each message identifies the machine from which it is received.

The input device is preferably adapted to poll the plurality of machines periodically for messages.

Preferably, the system includes memory adapted to store a map indicating the location of each machine. The alert signal preferably then includes data identifying the location of the machine from which the message was received that gave rise to the alert signal.

Preferably, the system further includes a user input device for enabling a user to interact with the system.

In addition, the system is preferably adapted to poll the or each machine for meter information indicative of accumulated history of events.

A second aspect of the invention provides a method of monitoring the performance of a validator for assessing a token, the method including the steps of:

receiving messages containing data indicative of validator events;

deriving timing information for the validator events; and comparing the data and timing information with predetermined criteria.

The step of deriving the timing information preferably includes extracting timestamp information from the messages.

Preferably, the step of deriving the timing information is performed with reference to the time of receipt of the messages by the input device.

The messages are preferably indicative of the following validator events:

an assessment of a token resulting in acceptance; and an assessment of a token resulting in rejection.

Preferably, the method further includes the step of determining walk-away events. In such cases, the predetermined criteria preferably include the criterion that a walk-away event has occurred. Alternatively, the predetermined criteria may include the criterion that greater than a predetermined threshold number of walk-away events have occurred.

Preferably, the predetermined criteria include the criterion that a number of assessments resulting in rejection exceeds a predetermined threshold number.

The method preferably further includes the step of outputting an alert signal when at least one of the predetermined criteria are satisfied. For example, the alert signal may be output to an alert device for attracting the attention of an operator.

In the preferred embodiment, the method includes receiving messages from a plurality of validators included in respective machines.

A third aspect of the invention provides a machine operable by a user providing a token, the machine including:

a token validator for assessing the token and generating an internal acceptability message indicative of whether the token is acceptable; and an output device responsive to the internal acceptability message for outputting an external acceptability message to an external device, the external acceptability message including timestamp information indicative of the time of generation of the internal acceptability message.

The machine preferably further includes a primary processor responsive to the internal acceptability message for implementing a primary function of the machine, and the output device is disposed in a communications path between the validator and the primary processor, the output device allowing messages to pass through from the validator to the primary processor.

Preferably, the external acceptability message preferably includes data indicative of a type of the token.

In the event of a token being rejected, the external acceptability message preferably includes data indicative of the reason for rejection of the token.

The machine preferably further includes a token storage device and the output device additionally outputs messages indicative of token storage device events.

Preferably, the output device buffers the received internal acceptability messages and preferably outputs the buffered messages in response to a polling signal received from the external device.

Preferably, the output device includes a network interface device for facilitating communication between the output device and the external device.

In some embodiments, the primary function of the machine is to provide a game. In others, the primary function of the machine is to sell an item, for example a ticket.

Preferably, the token is currency, for example a coin or preferably a banknote.

A fourth aspect of the invention provides a validator monitoring device for inclusion in a machine operable by a user providing a token, the device including:

an input device for receiving from a token validator for assessing the acceptability of tokens a validator event message containing data indicative of a validator event; and an output device responsive to the validator event message for outputting a further message including timestamp information indicative of the time the validator event occurred.

The device preferably further includes a buffer device for buffering received validator event messages for output to the external device.

Preferably, said output device outputs the messages to the external device in response to a polling signal received from the external device.

The device preferably further includes a pass-through channel for passing the validator event messages to a further device.

A fifth aspect of the invention provides a method of monitoring a network including a plurality of machines having respective validators and a monitoring system, the method including the steps of:

at the machines, generating messages including data indicative of validator events including acceptance and/or rejection of tokens; and at the monitoring system:

receiving the messages at the monitoring system; and comparing the data with predetermined criteria.

The method preferably further includes the step of, for each message received at the system, deriving timing information for the respective validator event, and wherein the predetermined criteria includes at least one timing-related criterion.

The method preferably also includes the step of determining walk-away events, being occasions when an assessment of a token resulting in rejection is followed by a period of greater than a predetermined threshold duration without an assessment resulting in acceptance or an assessment resulting in rejection.

The method preferably includes:

collating performance data for each machine; and manipulating numbers of walk-away events with reference to performance data of the machines.

In a particular embodiment, the method includes:
  collating performance data for each machine;
  for each machine, determining a ranking as a function of at least one of:
    anticipated transactions over a predetermined time interval,
    number of walk-away events occurring at the machine,
    total number of walk-away events at machines in the system, and
    number of machines in the system; and
  prioritizing maintenance of the machines in dependence upon the rankings.

Furthermore, when monitoring a network in which each machine is a representative of one of a number of types of machine, the method may also include the steps of:
  collating performance data for each machine type; and
  determining the ranking in dependence upon at least one of:
    anticipated transactions by machine type;
    number of walk-away events by machine type.

For example, the ranking for a machine of a particular type may be determined as a function of some or all of:
  the anticipated activity at that machine;
  the anticipated total activity at machines of that type;
  the number of machines of that type;
  the total number of machines;
  the number of walk-away events at that machine; and
  the total number of walk-away events at machines of that type.

The general level of activity at machines in the system may also be a factor in the determining of the ranking.

Additionally or alternatively, the method may include the step of determining a respective predetermined threshold duration for each machine in dependence upon the respective machines' associated performance data or, where each machine is a representative of one of a number of types of machine, determining a respective predetermined threshold duration for each machine type in dependence upon the performance data for the respective machine types.

In one embodiment of the method, the predetermined criteria include the criterion that, at one of the machines, greater than a predetermined threshold number of walk-away events have occurred.

In a further embodiment, the method includes the steps of determining a respective predetermined threshold number of walk-away events for each machine in dependence upon the respective machines' associated performance data or, where each machine is a representative of one of a number of types of machine, determining a respective predetermined threshold number of walk-away events for each machine type in dependence upon the performance data for the respective machine types.

A further aspect of the invention provides a method of modifying a machine operable by a user providing a token, including a token validator for assessing the acceptability of tokens and outputting validator event messages, the token validator being in communication with a primary processor for implementing a primary function of the machine, the method including the step of connecting to the validator a validator monitoring device as described above such that the validator monitoring device receives the validator event messages.

The method preferably includes the step of connecting the validator monitoring device to the primary processor such that validator event messages may pass from the validator to the primary processor via the validator monitoring device.

A further aspect of the invention provides a network including a system according to the first aspect of the invention and at least one machine according to the second or third aspect.

An further aspect of the invention provides a method of monitoring a network according to the preceding aspect including the steps of:
  generating at the at least one machine messages including data indicative of validator events including acceptance and/or rejection of tokens;
  receiving the messages at the monitoring system;
  comparing the data with predetermined criteria; and
  outputting an alert message when at least one of the criteria is satisfied.

The method preferably includes the step of, for message received at the system, deriving timing information for the respective validator event, the predetermined criteria including at least one timing related criterion.

Preferably, the timing information is derived from information contained in the message.

Additionally or alternatively, the timing information may be derived from the time of receipt of the message at the system.

Preferably, the alert message is sent to an alert device for attracting the attention of an operator.

Preferably, the alert message includes data identifying the machine that generated the message which gave rise to the alert message.

Preferably, the alert message further includes data identifying the criterion that was satisfied resulting in the alert message.

A further aspect of the invention provides a method of monitoring the performance of a network of machines each including a respective validator for assessing tokens, the method including the steps of:
  obtaining performance data for each machine;
  obtaining performance data for each validator; and
  manipulating the performance data for the machines with reference to the performance data for the validators.

Further aspects of the invention include a computer program for causing a computer to execute a method as set out above, and such a computer program carried by a data carrier or a signal.

BRIEF DESCRIPTION OF THE DRAWINGS

A preferred embodiment of the invention will now be described, by way of example only, with reference to the accompanying drawings in which.

DETAILED DESCRPTION

Figure 1:
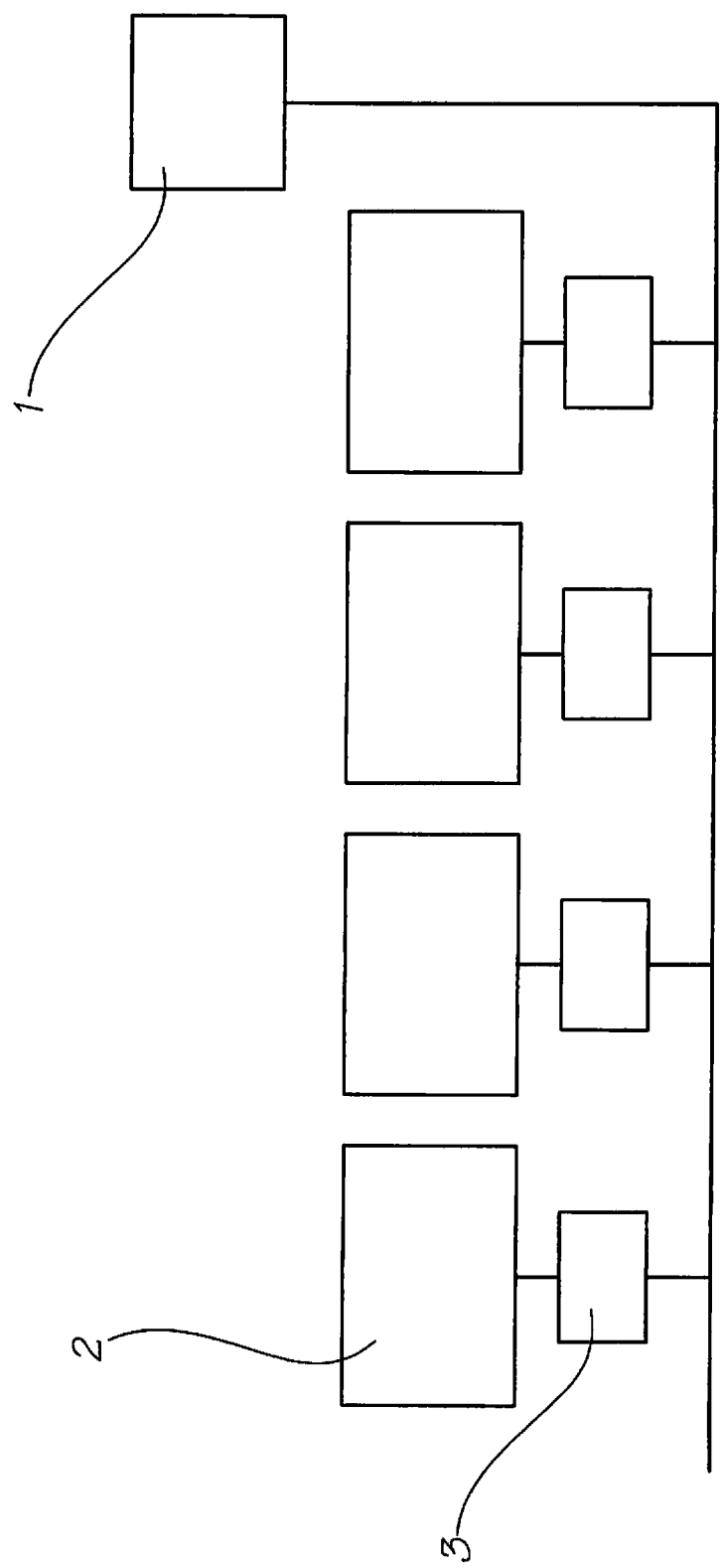
FIG. 1 is a schematic overview of a network including a system for monitoring validators that assess tokens and a plurality of machines operable by respective users by providing tokens.

FIG. 1 shows a network including a system in the form of a host computer 1 for monitoring validators that assess tokens, and a plurality of electronic gaming machines 2 operable by respective users providing tokens. Except where a more limited construction is clearly intended, the term "token" in this document includes any device or signal or representation of data that would be used to obtain credit for, or gain access to functionality of, a machine, or access a location, a resource, or an account, or otherwise to gain access to a product or process. A token may include but is not limited to a banknote, coin or other currency, or a card, ticket or other device or data carrier having representations of data, for example a magnetic strip, chip or other data representations, including radio frequency tags (RFID), recognizable by a validator. Without the token, access could be denied the user for the product or process, or otherwise they could be changed in how the user interfaces with the product or process.

The host 1 and the machines 2 communicate via internal or, as shown, external communications devices 3 in a known way. For example, various embodiments effect communication via Ethernet, wireless Ethernet, bluetooth, or telephony networks or combinations of these types of network. In a preferred embodiment, communication between the host and the machines occurs via a 9600-baud 8N1 RS485 multi-drop network using CRC checking.

Figure 2:
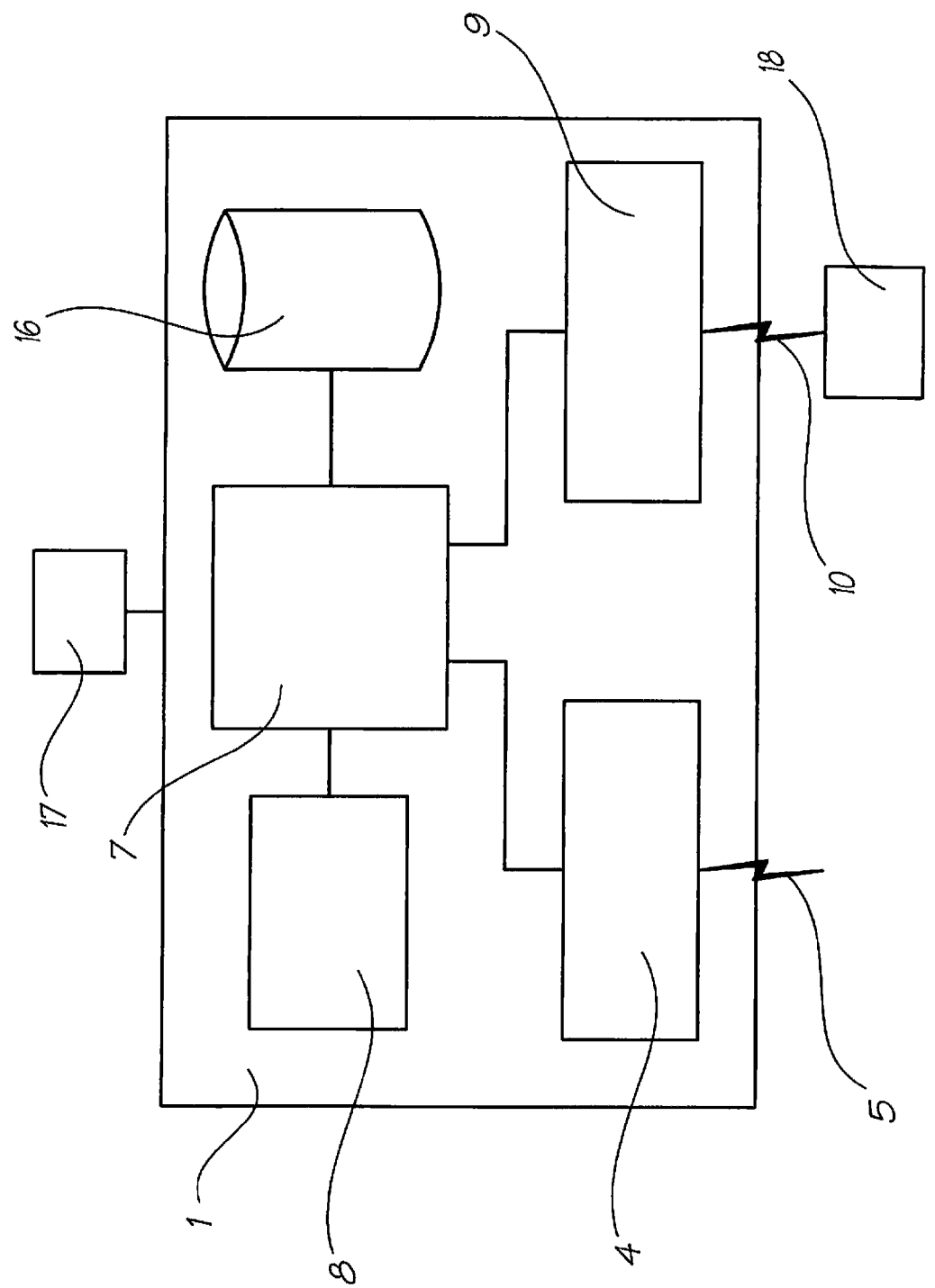
FIG. 2 is a more detailed schematic representation of the system for monitoring validators shown in FIG. 1.

The host 1 is shown in more detail in FIG. 2. It includes an input device 4 for receiving messages 5 from a machine 2 including a validator 6, the messages containing data indicative of validator events. The host further includes a processor 7, having associated memory 8, for deriving timing information for the validator events and for comparing the data and timing information with predetermined criteria. When at least one of the criteria is satisfied, the processor 7 outputs a signal to an output device 9. The output device 9 responds to the signal by outputting an alert signal 10.

Figure 3:
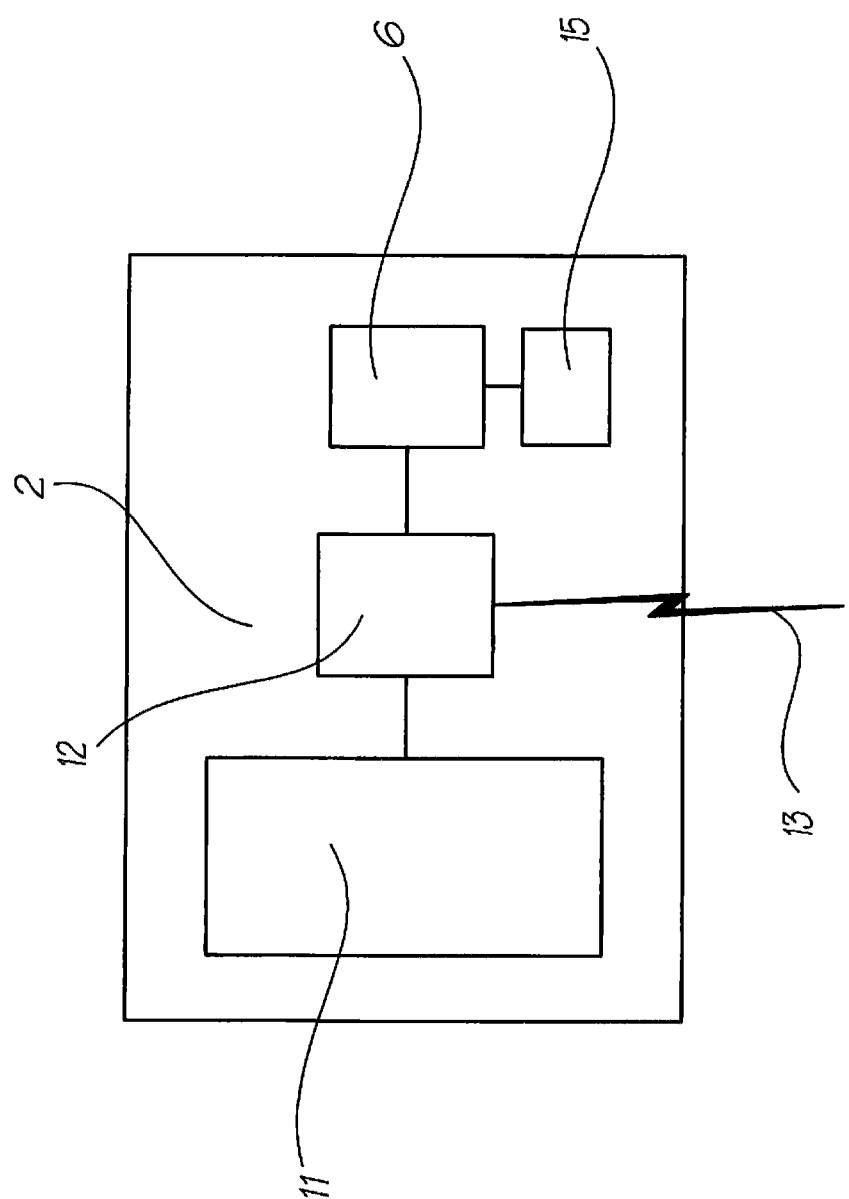
FIG. 3 is a more detailed schematic representation of a first embodiment of a machine operable by a user providing a token shown in FIG. 1.

FIG. 3 shows a first example of a machine 2 operable by a user providing a token, in this example a banknote. The machine includes a validator 6 for assessing the banknote and generating an internal acceptability message indicative of whether the banknote is acceptable. A primary processor 11 is responsive to the internal acceptability message for implementing a primary function of the machine. An output device 12 is responsive to the internal acceptability message for outputting in real time an external acceptability message 13 to an external device, for example the host 1 shown in FIG. 2.

The host input device 4 is adapted to poll the plurality of machines 2 in sequence periodically. Messages are received from each machine 2 at which a validator event has occurred during the preceding polling interval. Each message identifies the machine 2 at which it is generated, by including addressing information for the machine 2, the network card 3, the validator 6 or the output device 12 for example.

The processor 7 derives timing information for the validator events with reference to the time of receipt of the messages by the input device 4. For example, if the polling interval is 1 second and a polling sequence begins at 14:36:04, all messages received during that polling sequence are considered to have been received at 14:36:04. The validator events which gave rise to the messages are also considered to have occurred at 14:36:04. Alternatively, if it is known that generation and processing of messages by the machines 5 takes, say, 3 seconds, then 3 seconds may be subtracted from this time. When an accuracy of greater than 1 second is required, a shorter polling interval is used. Where necessary when using short polling intervals with networks having a large number of machines 2, a plurality of communications paths are used to ensure that the polling interval may be maintained.

Figure 4:
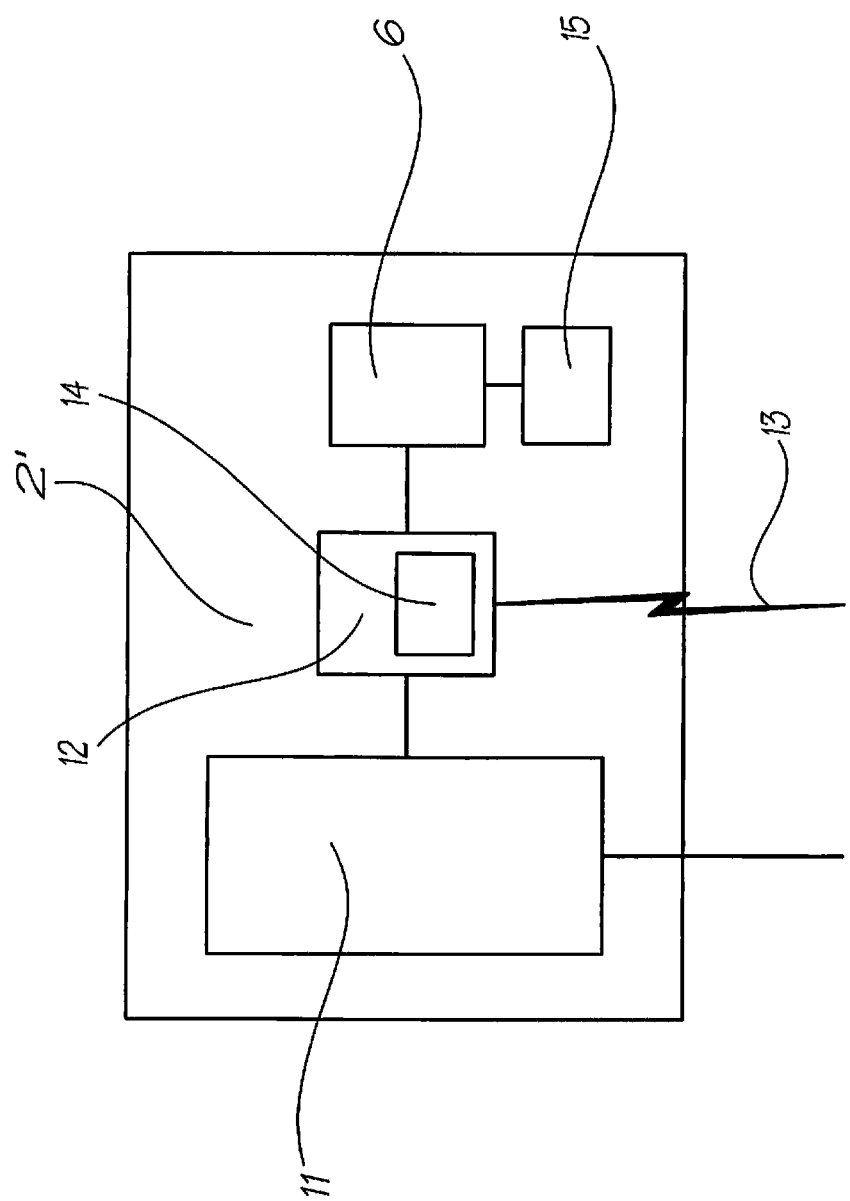
FIG. 4 is a more detailed schematic representation of a second embodiment of a machine operable by a user providing a token.

A further example of a machine 2' operable by a user providing a token is shown in FIG. 4. This example includes a token validator 6 for assessing the token, again a banknote in this example, and outputting an internal acceptability message indicative of whether the banknote is acceptable. A primary processor 11 is responsive to the internal acceptability message for implementing a primary function of the machine. An output device 12' is responsive to the internal acceptability message for outputting an external acceptability message 13 to an external device. In this example, which is particularly adapted for use in networks in which a high degree of temporal resolution is required, the external acceptability message 13 includes time stamp information indicative of the time of generation of the internal acceptability message. The time stamp information is added to the message by a time stamping device 14. In one embodiment, absolute time stamps are used indicating absolutely the time of generation of the message. However, in alternative embodiments, relative time stamps are used, including an offset value indicating the time offset from a reference point, for example, the time of the last polling of the machine 2.

When used in combination with one or more machines 2' of this type, the host processor 7 derives the timing information by extracting the time stamp information from received messages. In embodiments using relative time stamps, the host computer derives the time of generation of the messages with reference both to the time stamp information and to internal information relating to the timing of the polling of the machines.

In the embodiment shown in FIG. 4, the machine primary processor 11 also outputs messages relating to the game being played on the gaming machine in a manner well-known to those in the field of networking gaming machines. In one embodiment, the primary processors 11 of the gaming machines 2 are linked using a network separate from the network provided for monitoring validator activity. However, in another embodiment, the same network is used for both purposes. In one such embodiment, the primary processors 11 use network cards separate from those provided for the output devices 12'. In an alternative embodiment, the output devices and the primary processors share network cards. While this feature has been described with reference to the machine shown in FIG. 4, it is equally applicable to that shown in FIG. 3.

As shown in FIGS. 3 and 4, the output device 12' is disposed in a communications path between the validator 6 and the primary processor 11. It allows messages from the validator to pass through to the primary processor and also buffers the messages for output to the host 1. In an alternative embodiment, for use in networks in which polling is likely to be at least as frequent as generation of event messages, an output device is used that only stores the most recently generated event message for output to the host.

The output device 12' outputs buffered or stored messages in response to the polling signal received from the external device.

Figure 5:
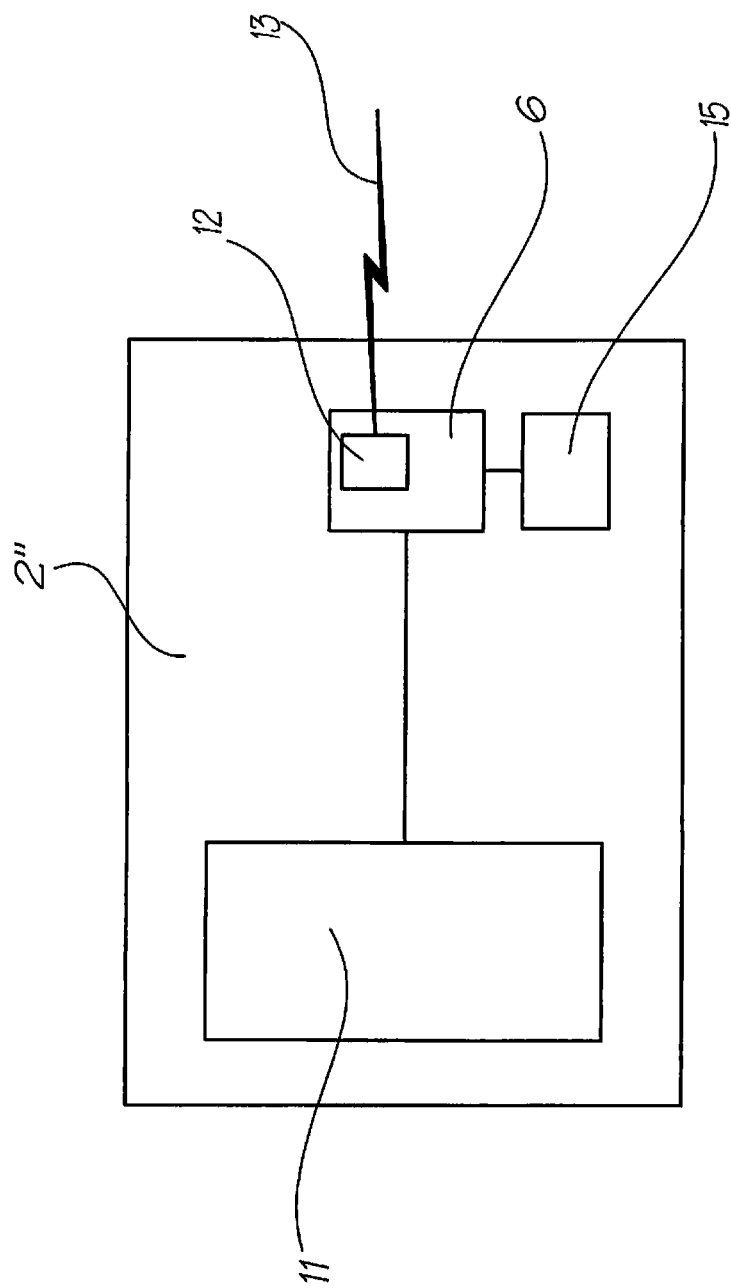
FIG. 5 is a more detailed schematic representation of a third embodiment of a machine operable by a user providing a token.
Figure 6:
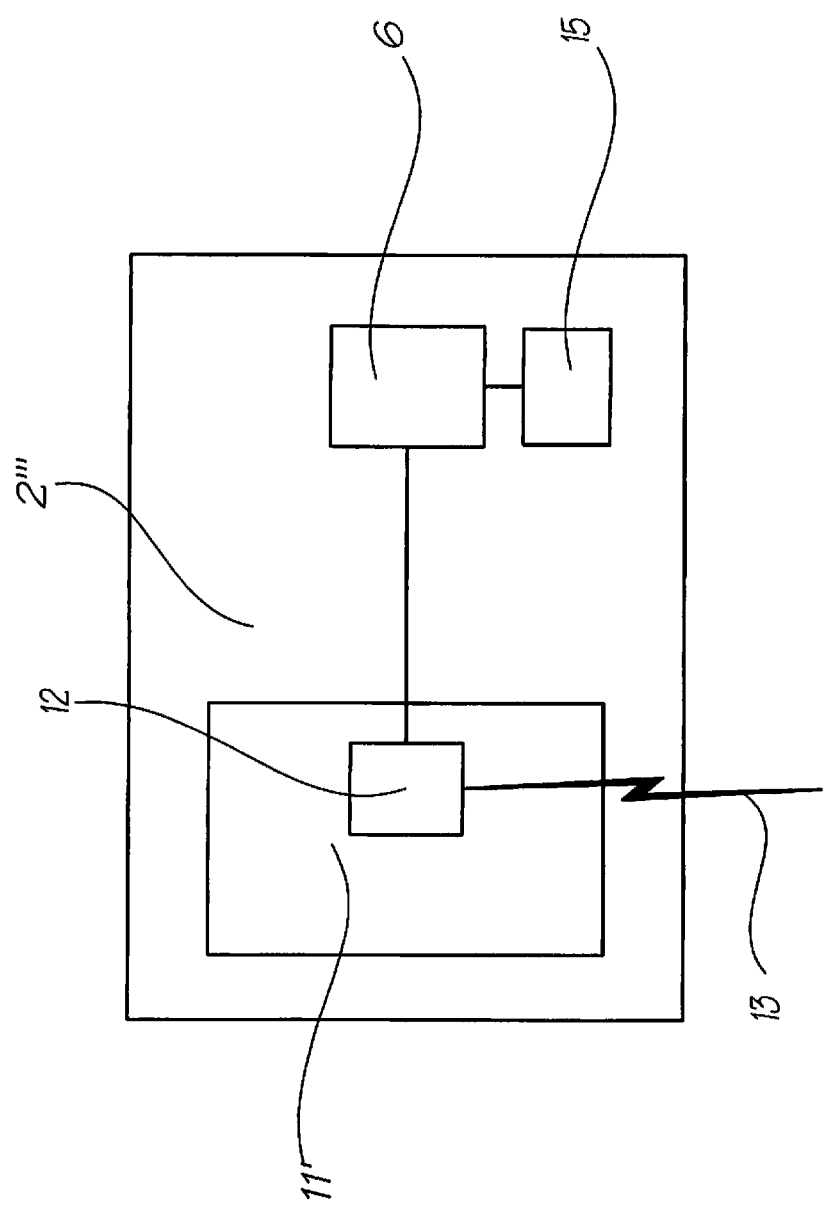
FIG. 6 is a more detailed schematic representation of a fourth embodiment of a machine operable by a user providing a token.

In the preceding examples of machines shown in FIGS. 3 and 4, the output device is shown as being distinct from the validator 6 and the primary processor 11. However in one embodiment, shown in FIG. 5, the output device 12 is integral with the validator 6'. In another embodiment, shown in FIG. 6, the output device 12 is integral with the primary processor 11'.

As indicated above, validator events that cause the generation of validator event messages include assessments of banknotes resulting in acceptance and assessments of banknotes resulting in rejection. The machines 2 also include respective token storage devices in the form of note stackers 15. Storage device events such as the removal of the note stacker 15 or the storage of insertion of a note into the stacker resulting in the stacker being full also cause the generation of a validator event message containing information indicative of the storage device event.

In addition to the information identifying the machine that generated the message, and the time stamp information in the case of machines 2' described above with reference to FIG. 4, each validator event message includes:

Information indicative of the type of event: for example, assessment of a token resulting in acceptance (acceptance message), assessment of a token resulting in rejection (rejection message), removal of the note stacker, the note stacker becoming full.

Further information relating to the event: in the case of an acceptance message, the type of the token, for example, the denomination of the banknote; in the case of a rejection message, the reason for the rejection (for example, failed optical/magnetic test, note jam).

The host 1 includes a data collating device in the form of a SQL database 16 for collating the data from the received validator event messages. Upon receiving validator event messages, the host processor 7 stores the data in the database 16. In one embodiment, after processing each received message, the processor checks whether the stored data satisfies any of the criteria for generation of an alert message. In other embodiments, this step is performed once at the end of each polling period. In yet further embodiments, the checking is performed periodically and separately from the polling of the machines.

The host 1 also stores in the database 16 or other memory 8 information relating to the various criteria against which the stored data is to be checked to determine whether an alert signal is to be generated. A first broad category of criterion for generation of an alert message includes the criterion that a number of assessments resulting in rejection exceeds a predetermined threshold. In one embodiment, assessments occurring within a predetermined window of a predetermined number m of consecutive assessments of an inserted banknote are considered. For example, for each machine 2 the processor 7 checks the most recent 100 assessments and an alert signal is generated if the number of rejections is greater than a predetermined threshold of 10, that is that acceptance has dropped below 90%. Different thresholds, for example representing acceptance rates of 80%, 70%, 60% and so on, and windows of different sizes, for example 50, 200, 500 or 1000 assessments, are used as appropriate, according to preference. This type of criterion may be of assistance particularly in identifying validators whose ability to identify correctly inserted banknotes is declining.

In another embodiment, assessments occurring within a predetermined time interval m are considered. In this embodiment, for each machine 2 the processor 7 checks assessments within a time interval, for example, the preceding 15 minutes, and an alert signal is generated if the number of rejections is greater than a predetermined threshold of 2. This type of criterion may be of assistance particularly in identifying a machine 2 at which a user requires assistance, for example because they are not aware that a token that they are attempting repeatedly to insert is invalid—such as the wrong type of card or a counterfeit banknote. It may also be of assistance in identifying a machine at which a user is attempting to launder counterfeit banknotes.

A second category of criterion includes the criterion that the proportion of assessments at a particular machine 2 resulting in acceptance of a particular type of token falls below another threshold. For example, if the proportion of acceptances that relate to $10 notes falls below a threshold value, this may be indicative of a decline in a particular validators ability to identify $10 notes correctly. In some embodiments, the threshold is determined with reference to the proportions of the various denominations being accepted at all machines. In other embodiments, the threshold is determined with reference to historical data, for example relating to the typical proportions expected at a particular time of day.

A further broad category of criterion includes the consideration of walk-away events. A walk-away event is defined as an occasion when an assessment of a token resulting in rejection of that token is followed by a period of greater than a predetermined threshold duration without an assessment resulting in rejection or an assessment resulting in acceptance. In some embodiments, a more limited definition may be used: i.e. a walk-away event is an occasion when a series of greater than a predetermined number of assessments resulting in rejection of a token occurs within a predetermined time interval, and the series of assessments resulting in rejection is followed by a period of greater than a predetermined threshold duration without an assessment resulting in rejection or an assessment resulting in acceptance.

Such events are of interest since, in a retail or gaming scenario, they may be indicative of lost revenue in that an intended user of a machine has attempted to effect a transaction, but has been prevented by the validator. On some such occasions, the user may use another machine, resulting in no loss of revenue, but perhaps in irritation to the user. On other such occasions, however, the result may be that the user abandons the attempted transaction altogether. In other scenarios, for example automated ticket sales at transport stations, the walk-away events may result in increased demand on manned sales points. Increasing the need for such points, and their associated cost.

The processor 7 also checks whether a message has been received indicating that a note stacker 15 is full or that it has been removed. Such criteria may assist staff at a venue to identify machines 2 that require attention—for example, emptying of the note stacker 15—or to have greater information to monitor the emptying of note stackers 15 by noting the precise time a stacker is removed.

Figure 7:
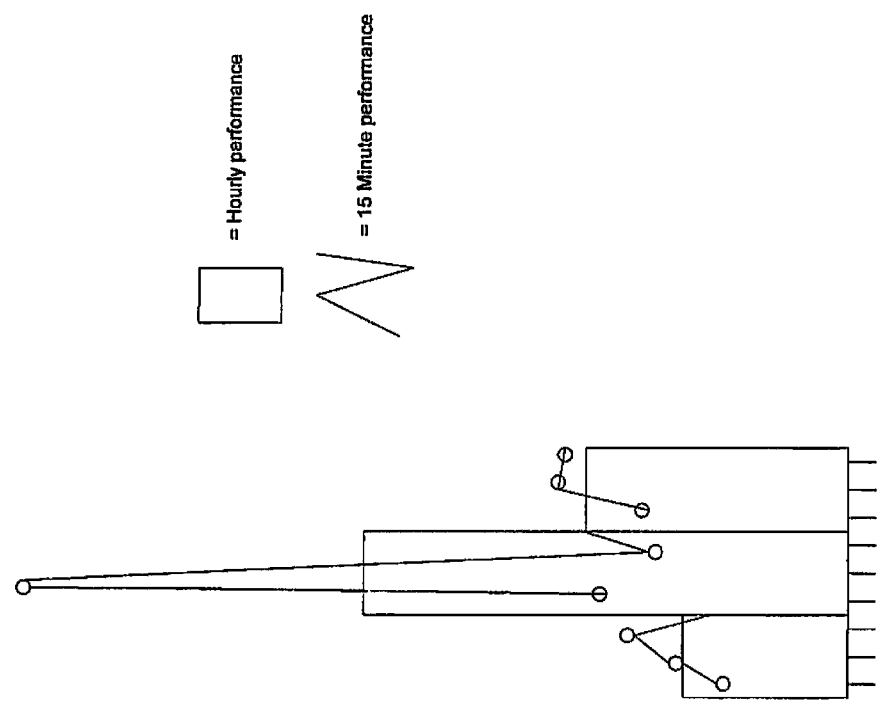
FIG. 7 is a detail of a first graphical report that may be produced by the system shown in FIG. 1.
Figure 8:
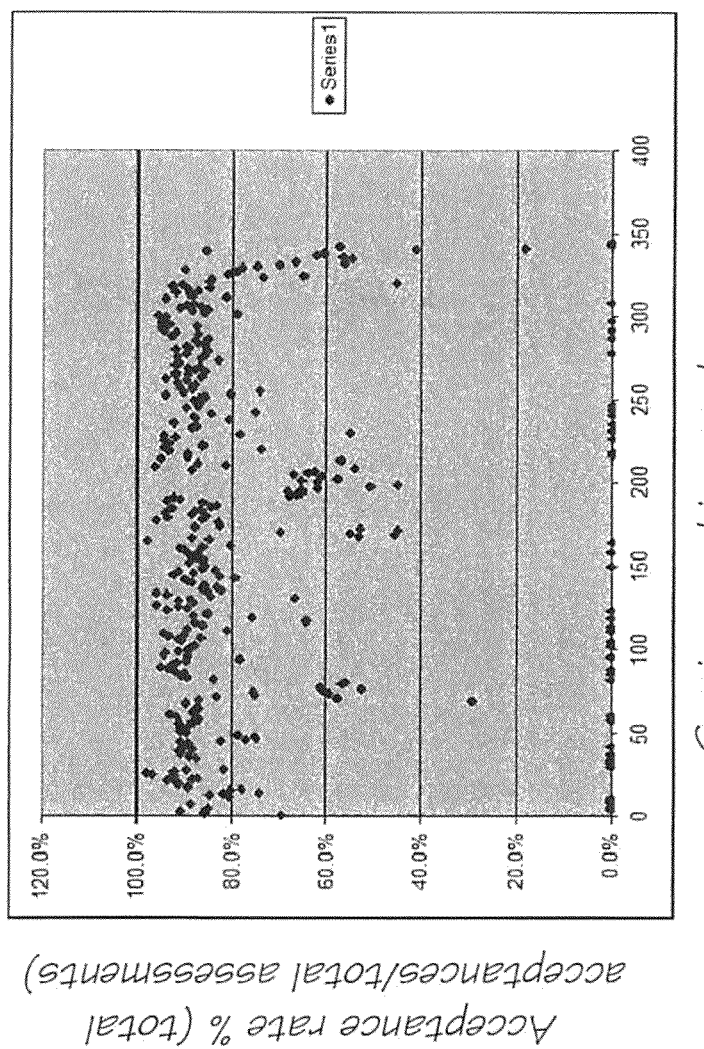
FIG. 8 is a second graphical report that may be produced by the system shown in FIG. 1.

A user input device 17, for example a keyboard and/or a mouse in combination with a graphical user interface, is provided for enabling a user having a password to interact with the system, add or modify the various criteria and thresholds and the destinations of alert signals, and add, modify or remove details of particular machines 2. The input device 17 is also used by a user to access various reports. Reports available to a user include graphs for each machine 2 representing acceptance or rejection proportions against time, including proportions over various time intervals a detail of one of which is shown in FIG. 7 and lists of machines 2 which are offline. Other reports include lists of machines 2 that are performing above or below respective general or machine-specific criteria, for example acceptance percentages, including information indicative of actual performance. In a particular embodiment, these lists are limited to machines 2 at which more than a predetermined threshold number of assessments have been made, to avoid undue attention being paid to machines 2 for which the amount of available data is statistically insignificant. This threshold may be set by the user. FIG. 8 shows a further report in the form of a scatter graph showing the acceptance proportions for each machine in a network.

A number of examples of methods of monitoring walk-away events will now be provided with reference to a gaming establishment having thirty gaming machines each having respective validators and each interconnected in a manner described above. General performance data for the various machines is collated in manner known to those skilled in the art. Furthermore, performance data for the validators in the machines is collated in a manner described above.

Over a period of one week, the walk-away events occurring are summarized in the following table:

TABLE 1

Walk-Away Events

| Machine # | Event Time |
|---|---|
| 11 | 07 Feb. 2006 1:23:26 PM |
| 1 | 07 Feb. 2006 8:39:21 PM |
| 19 | 07 Feb. 2006 9:02:08 PM |
| 9 | 08 Feb. 2006 10:53:40 PM |
| 17 | 08 Feb. 2006 11:32:50 PM |
| 16 | 08 Feb. 2006 5:50:07 PM |
| 16 | 08 Feb. 2006 7:01:55 PM |
| 8 | 08 Feb. 2006 8:12:54 PM |
| 30 | 08 Feb. 2006 8:16:16 PM |
| 28 | 09 Feb. 2006 7:30:07 PM |
| 24 | 09 Feb. 2006 9:07:20 PM |
| 9 | 09 Feb. 2006 10:36:33 PM |
| 17 | 09 Feb. 2006 10:36:50 PM |
| 20 | 09 Feb. 2006 10:55:04 PM |
| 12 | 09 Feb. 2006 11:10:52 PM |
| 17 | 10 Feb. 2006 3:00:40 PM |
| 20 | 10 Feb. 2006 5:07:13 PM |
| 28 | 10 Feb. 2006 5:57:06 PM |
| 1 | 10 Feb. 2006 6:41:26 PM |
| 30 | 10 Feb. 2006 6:50:53 PM |
| 26 | 10 Feb. 2006 9:05:00 PM |
| 24 | 10 Feb. 2006 9:13:25 PM |
| 29 | 10 Feb. 2006 9:20:29 PM |
| 6 | 10 Feb. 2006 9:22:38 PM |
| 13 | 10 Feb. 2006 10:02:26 PM |
| 30 | 11 Feb. 2006 12:12:49 AM |
| 3 | 11 Feb. 2006 12:46:30 AM |
| 30 | 11 Feb. 2006 11:21:44 AM |
| 9 | 11 Feb. 2006 11:45:15 AM |
| 30 | 11 Feb. 2006 4:08:33 PM |
| 6 | 11 Feb. 2006 6:16:52 PM |
| 19 | 12 Feb. 2006 1:01:15 AM |
| 8 | 12 Feb. 2006 5:05:56 PM |
| 24 | 12 Feb. 2006 5:07:12 PM |
| 4 | 12 Feb. 2006 6:14:00 PM |

In a simple embodiment, an operator is alerted when a walk-away event occurs, or when the number or frequency of walk-away events occurring at a particular machine reaches a predetermined threshold value. However, other embodiments provide more sophisticated methods of considering walk-away events.

In one such embodiment, the total number of walk-away events in a specified time interval in a venue having a number of machines is monitored. An example of this is shown in the following table:

TABLE 2

Walk-Awa Events b dare

| Date | Walk-Away Events |
|---|---|
| 07 Feb. 2006 | 3 |
| 08 Feb. 2006 | 6 |
| 09 Feb. 2006 | 6 |
| 10 Feb. 2006 | 10 |
| 11 Feb. 2006 | 6 |
| 12 Feb. 2006 | 4 |
| 13 Feb. 2006 | 0 |
| Total | 35 |

Such information may be correlated with information relating to general activity in a venue. The tracking of walk-away events during a specified time interval in this way may allow an operator to identify peaks in walk-away activity, which may be indicative of attempted use of counterfeit currency, particularly where peaks in walk-away activity do not correspond with peaks in general activity.

In another embodiment, the number of walk-away events is monitored by machine. This is illustrated in Table 3 below:

TABLE 3

Walk-Awa Events b Machine

| Machine # | Machine type | Walk-Away Events |
|---|---|---|
| 1 | A | 2 |
| 3 | B | 1 |
| 4 | C | 1 |
| 6 | D | 2 |
| 8 | B | 2 |
| 9 | E | 3 |
| 11 | F | 1 |
| 12 | G | 1 |
| 13 | H | 1 |
| 16 | I | 2 |
| 17 | J | 3 |
| 19 | K | 2 |
| 20 | K | 2 |
| 24 | L | 3 |
| 26 | M | 1 |
| 28 | K | 2 |
| 29 | N | 1 |
| 30 | J | 5 |

In this way, it may be readily seen which machines are suffering the greatest number of walk-away events. This information may be used for the purposes of prioritizing the maintenance of the validators (e.g. replacement or repair). More sophisticated method of prioritizing maintenance are described below.

In a first such method, regard is had to the number of transactions expected at a particular machine in a specified time period. This information may be derived, for example, from historical data relating to activity at the various machines. Since it is likely that priority should be given to machines having large numbers of anticipated transactions in a given time interval (say, one hour) and large numbers of walk-away events in a time interval, multiplying these two factors may result in a figure by which the machines may be prioritized for maintenance. An example of this is given in Table 4, below:

TABLE 4

Machines ranked for maintenance by Walk-Away Events × anticipated transactions per hour

| Machine # | Anticipated transactions at machine/hour | Walk-Away Events | Anticipated transactions at machine × # walk-away events |
|---|---|---|---|
| 30 | 16 | 5 | 80 |
| 24 | 19 | 3 | 57 |
| 1 | 17 | 2 | 34 |
| 17 | 11 | 3 | 33 |
| 19 | 15 | 2 | 30 |
| 6 | 14 | 2 | 28 |
| 16 | 14 | 2 | 28 |
| 20 | 13 | 2 | 26 |
| 9 | 7 | 3 | 21 |
| 13 | 16 | 1 | 16 |
| 29 | 16 | 1 | 16 |
| 3 | 15 | 1 | 15 |
| 8 | 7 | 2 | 14 |
| 12 | 12 | 1 | 12 |
| 11 | 10 | 1 | 10 |
| 26 | 2 | 1 | 2 |
| 2 | 18 | 0 | 0 |
| 4 | 0 | 1 | 0 |
| 5 | 1 | 0 | 0 |
| 7 | 8 | 0 | 0 |
| 10 | 11 | 0 | 0 |
| 14 | 18 | 0 | 0 |
| 15 | 11 | 0 | 0 |
| 18 | 6 | 0 | 0 |
| 21 | 0 | 0 | 0 |
| 22 | 7 | 0 | 0 |
| 23 | 5 | 0 | 0 |
| 25 | 8 | 0 | 0 |
| 27 | 5 | 0 | 0 |
| 28 | 0 | 2 | 0 |

In some contexts, for example in gaming venues, the machines connected to a system may each be examples of a particular machine type. In a gaming venue, each machine provides a particular game, and the various games may have varying degrees of popularity. Table 5 below shows the machines ranked according to the product of the number of walk-away events at the respective machines and the anticipated total number of transaction at the type of machine. The anticipated total number of transactions at a particular machine type may again be derived from historical activity data.

TABLE 5

Machines ranked for maintenance by Walk-Away Events × anticipated transactions per hour at machine type

| Machine # | Machine type | Anticipated transactions at machine type/hour | Walk Away Events | Anticipated transactions at machine type × # walk-away events |
|---|---|---|---|---|
| 30 | J | 27 | 5 | 135 |
| 17 | J | 27 | 3 | 81 |
| 1 | A | 35 | 2 | 70 |
| 6 | D | 30 | 2 | 60 |
| 24 | L | 19 | 3 | 57 |
| 19 | K | 28 | 2 | 56 |
| 20 | K | 28 | 2 | 56 |
| 28 | K | 28 | 2 | 56 |
| 8 | B | 23 | 2 | 46 |
| 13 | H | 34 | 1 | 34 |
| 12 | G | 29 | 1 | 29 |
| 16 | I | 14 | 2 | 28 |
| 3 | B | 23 | 1 | 23 |
| 9 | E | 7 | 3 | 21 |
| 29 | N | 21 | 1 | 21 |
| 11 | F | 18 | 1 | 18 |
| 4 | C | 15 | 1 | 15 |
| 26 | M | 2 | 1 | 2 |
| 2 | A | 35 | 0 | 0 |
| 5 | B | 23 | 0 | 0 |
| 7 | C | 15 | 0 | 0 |
| 10 | D | 30 | 0 | 0 |
| 14 | H | 34 | 0 | 0 |
| 15 | G | 29 | 0 | 0 |
| 18 | G | 29 | 0 | 0 |
| 21 | K | 28 | 0 | 0 |
| 22 | C | 15 | 0 | 0 |
| 23 | D | 30 | 0 | 0 |
| 25 | F | 18 | 0 | 0 |
| 27 | N | 21 | 0 | 0 |

In a final example, it may be that the various machine types have varying popularity and that particular machines within a machine type also have varying degrees of popularity. Table 6 below therefore shows the machines ranked by the product of the anticipated number of transactions at a particular machine (to take account of the popularity of that specific machine), the total number of transactions at the machine type (to take account of the relative popularities of the machine types), and the number of walk-away event occurring at the machines.

TABLE 6

Machines ranked for maintenance by Walk-Away Events × anticipated transactions per hour at machine type × anticipated transactions per hour at machine

| Machine # | Machine type | Anticipated transactions at machine/hour | Anticipated transactions at machine type/hour | Walk Away Events | Anticipated transactions at machine × anticipated transactions at machine type × # walk-away events |
|---|---|---|---|---|---|
| 30 | J | 16 | 27 | 5 | 2160 |
| 1 | A | 17 | 35 | 2 | 1190 |
| 24 | L | 19 | 19 | 3 | 1083 |
| 17 | J | 11 | 27 | 3 | 891 |
| 6 | D | 14 | 30 | 2 | 840 |
| 19 | K | 15 | 28 | 2 | 840 |
| 20 | K | 13 | 28 | 2 | 728 |
| 13 | H | 16 | 34 | 1 | 544 |
| 16 | I | 14 | 14 | 2 | 392 |
| 12 | G | 12 | 29 | 1 | 348 |
| 3 | B | 15 | 23 | 1 | 345 |
| 29 | N | 16 | 21 | 1 | 336 |
| 8 | B | 7 | 23 | 2 | 322 |
| 11 | F | 10 | 18 | 1 | 180 |
| 9 | E | 7 | 7 | 3 | 147 |

TABLE 6-continued

Machines ranked for maintenance by Walk-Away Events × anticipated transactions per hour at machine type × anticipated transactions per hour at machine

| Machine # | Machine type | Anticipated transactions at machine/ hour | Anticipated transactions at machine type/hour | Walk Away Events | Anticipated transactions at machine × anticipated transactions at machine type × # walk-away events |
|---|---|---|---|---|---|
| 26 | M | 2 | 2 | 1 | 4 |
| 2 | A | 18 | 35 | 0 | 0 |
| 4 | C | 0 | 15 | 1 | 0 |
| 5 | B | 1 | 23 | 0 | 0 |
| 7 | C | 8 | 15 | 0 | 0 |
| 10 | D | 11 | 30 | 0 | 0 |
| 14 | H | 18 | 34 | 0 | 0 |
| 15 | G | 11 | 29 | 0 | 0 |
| 18 | G | 6 | 29 | 0 | 0 |
| 21 | K | 0 | 28 | 0 | 0 |
| 22 | C | 7 | 15 | 0 | 0 |
| 23 | D | 5 | 30 | 0 | 0 |
| 25 | F | 8 | 18 | 0 | 0 |
| 27 | N | 5 | 21 | 0 | 0 |
| 28 | K | 0 | 28 | 2 | 0 |

The above examples are each examples of a more general strategy of ranking the gaming machines by a factor determined as a function of various parameters. The ranking factor for a particular machine, $R_i$, may be generalized as:

$$R_i f(A_i, A(T_i), n(T_i), n, W_i, W(T_i))$$

where $A_i$ is the anticipated activity (e.g. number of transactions) at a particular machine in a predetermined time interval, $A(T_i)$ is the anticipated total activity at machines of the same type as the particular machine during the same predetermined time interval, $n(T_i)$ is the total number of machines of the same type as the particular machine, n is the total number of machines in the network, $W_i$ is the number of walk-away events at the particular machine in a specified time interval, and $W(T_i)$ is the total number of walk-away events at machines of the same type as the particular machine in the same time interval.

In the above examples, the coefficients or exponents of some of the parameters are zero while others are 1. Other strategies are possible in which the coefficients or exponents take other values. For example, it may be determined that a machine should be considered a lower priority if it is of a type of which there are a number of examples in the system: $n(T_i)$ may therefore have a negative exponent. However to take account of user preferences for a particular machine regardless of the availability of others of the same type, the exponent may have an absolute value of less than one: e.g. −0.5.

The strategy appropriate for a particular network may also depend upon various other factors such as overall activity in a system. For example, in a gaming venue where activity is approaching the total capacity of the venue, the existence of more than one machine of a type will be of less relevance, since an intended user of a particular machine may find no other examples of that machine type available to him. Conversely, where overall activity is low, a user may easily find another example of a particular machine type.

Scheduling of maintenance may be automated to some extent by use of the system described above, and messages may be sent to a pager or other communications device as described above, specifying the next machine on which maintenance is to be performed.

As indicated above, walk-away events are occasions on which an assessment of a token resulting in rejection of that token is followed by a period of greater than a predetermined threshold duration without an assessment resulting in rejection or an assessment resulting in acceptance. In one embodiment, in which the definition of a walk-away event is intended as closely as possible to reflect the actual occurrences of a user attempting to insert a token into validator and abandoning the attempt after a rejection, the predetermined threshold duration is fixed, and is identical for all machines. For example, two minutes may be appropriate.

However, in addition to or as an alternative to the methods described above of considering walk-away events and managing the varying popularity of machines and machine types, the predetermined threshold duration may differ for different machines or machine types. Furthermore, the predetermined threshold durations may change depending upon general levels of activity or anticipated levels of activity.

Different levels of security may be used in a known way for example to allow some users to view database reports while preventing modification of criteria, thresholds and so on.

The database 16 also includes information identifying other characteristics of the machines 2, for example the game being provided by the machines 2, current status—online or offline, identification numbers of the machines 2, and the location of the various machines 2. In one embodiment, this location information is purely textual. However, in other embodiments, images such as floor plans and image/text combinations are used.

When one of the criteria for generation of an alert signal is satisfied, the processor 7 sends a signal to the output device 9, which responds by sending the alert signal to an alert device 8 adapted to attract the attention of an operator. Various types of alert device 18 are used in various embodiments, including pager devices, mobile telephones using SMS or automated voice calls, public address systems, computer devices using email or network alerts, and so on.

The alert signal identifies the machine 2 giving rise to the alert signal, including textual and/or graphical information about the location of the machine 2. The signal also includes information indicative of the reason for the alert signal. In a particular embodiment, alert signals generated in response to different types of criteria are sent to different alert devices 18 to attract the attention of different personnel. For example with reference to FIG. 7, a spike in the number of rejections occurring over a short time might cause a signal to be sent to a device to alert customer service and/or security personnel;

the proportion of rejections within a preceding number of insertions of banknotes rising above a threshold or a note jam might cause a signal to be sent to a device 18 to alert maintenance personnel. For testing purposes, an alert signal may be sent simply when a note is accepted or rejected, for example after maintenance of a validator 6. An alert signal may also be sent when a note of a particular denomination is accepted, for example a high value note, or when tampering with the validator is detected.

To provide further data, the host 1 may upon request of a user and/or periodically poll the various machines 2 for meter information indicative of the total number of acceptances and rejections of various denominations, for example, since the last poll or some other reference point, as an indication of the history of events. This information may be retrieved from memory in the output devices or from the validators themselves. This may be of assistance in rapidly recommencing monitoring in the event that the host computer is offline for a period.

Figure 9:
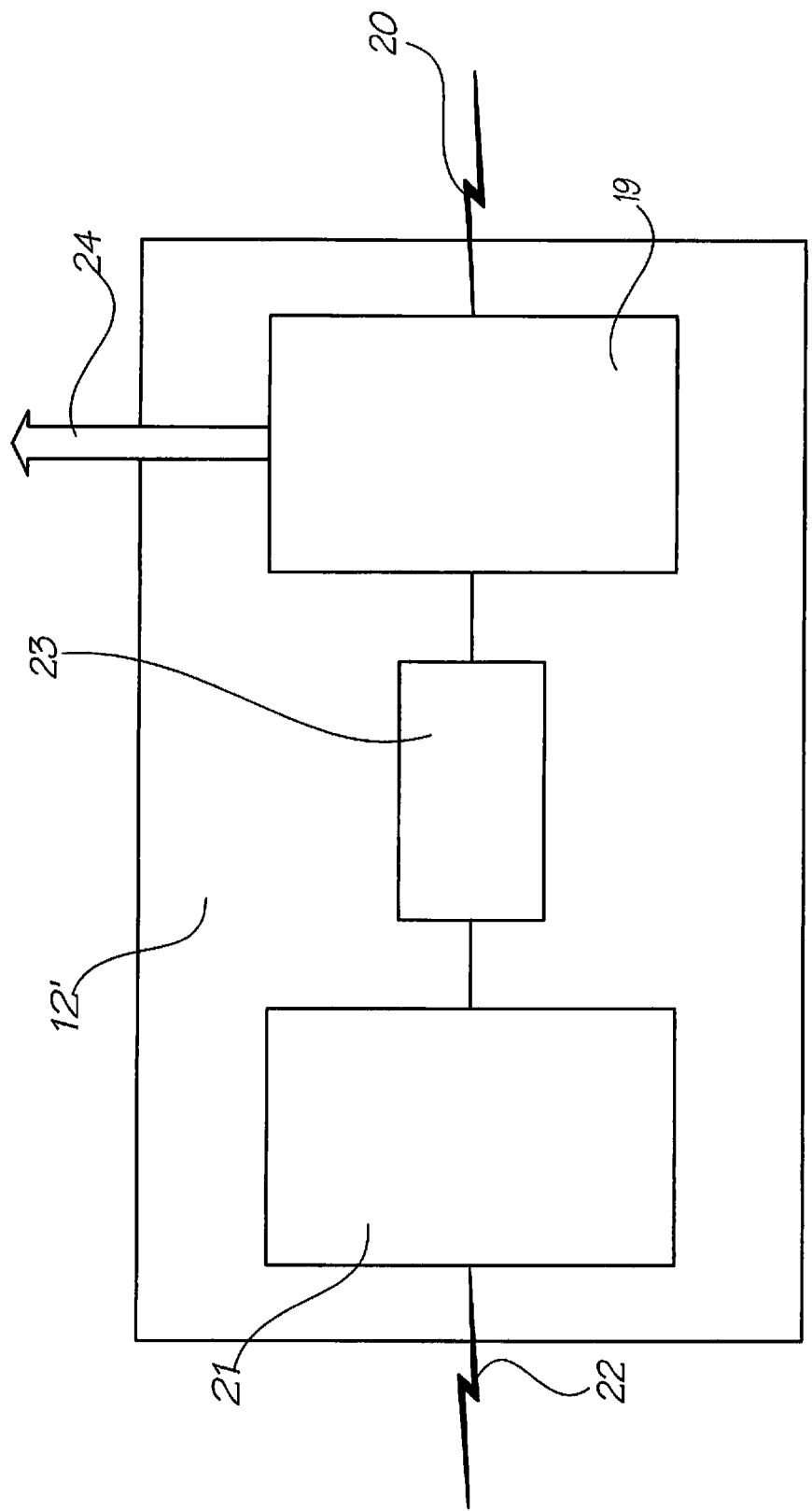
FIG. 9 is a schematic representation of a device for inclusion in a machine operable by a user provided with a token.

Turning to FIG. 9, a particular embodiment provides separately a validator monitoring device 12', equivalent to the output device 12 described above, for inclusion in a machine operable by a user provided with a token. The device includes an input device 19 for receiving from a token validator for assessing the acceptability of tokens a validator event message 20 containing data indicative of a validator event. An output device 21 is responsive to the validator event message for outputting a further message 22 in real time to an external device such as the host 1 for example via a network as described above with reference to FIG. 1. Such a monitoring device 12' may be retrofitted to an existing machine to allow its validator 6 to be monitored as described above. In a particular embodiment, the further message 22 includes time stamp information indicative of the time the validator event occurred. In one embodiment, this time stamp information is received in the validator event message 20 and simply passed through the device 12'. In another embodiment, the device 12' inserts the time stamp information into the message. In embodiments in which the device itself adds the time stamp information, the outputting of the further message need not be in real time.

The device 12' further includes a buffer device 23 for buffering received validator event messages 20 for output to the external device. The output device 21 outputs the messages 22 to the external device in response to a polling signal received from the external device, as described above.

In a particular embodiment, the device 12' is intended to be inserted into the machine in the communications path between the validator 6 and the primary processor 11 of the machine. In such cases, the device 12' further includes a pass-through channel 24 for passing the validator event messages 20 to the machine primary processor 11.

In addition to monitoring individual validators, the invention also finds application in the monitoring of a network of machines. For example, it is known to monitor the turnover of various gaming machines to identify favoured locations on a gaming floor or to identify popular games. Manipulation of the machine performance data with reference to validator performance data may assist in formulating accurate conclusions from the machine performance data. For example, a machine which has low turnover but which also has a low acceptance rate may be omitted from consideration of the popularity of the game being provided by that machine. Additionally or alternatively, gaming floor locations at which acceptance levels are consistently low may be identified as requiring additional security measures.

Although the invention has been described primarily with reference to its application in networks of electronic gaming machines, it will be clear to those skilled in the art that it also finds application many other forms. In particular, the invention finds application in connection with other machines, for example vending machines for confectionery or tickets, and ticket or card-operated gates and so on. Furthermore, features of the various described examples may be provided in any combination.

Additionally, the various functionalities have been described as being performed by distinct devices, such as integrated circuits. However, in preferred embodiments, all or any combination of functionalities may instead be performed by multi-purpose integrated circuits or implemented in software executed by a processor. Particularly in such cases, the invention may additionally be embodied in a computer program or in a computer program in a data signal or stored on a data carrier.

The invention claimed is:

1. A system comprising:
an input device configured to receive messages from plural machines having validators that assess payment tokens, the messages indicative of at least one of acceptance or rejection of the payment tokens; and
a processor configured to identify a walk-away event at a first machine of the machines when a first validator at the first machine rejects a first payment token and at least a threshold time period expires following this rejection without the first validator accepting or rejecting a second payment token, the processor also configured to request servicing of at least one of the first validator or the first machine based on the walk-away event,
wherein the processor is configured to request servicing of one or more of the validators or the machines according to a priority that is based on walk-away events identified at the machines.

2. The system of claim 1, wherein the processor is configured to identify the walk-away event when a number of assessments of the payment tokens at the first machine resulting in rejection of the payment tokens exceed a designated threshold.

3. The system of claim 1, wherein the messages received from the machines identify which of the machines transmitted the messages.

4. The system of claim 1, wherein the processor is configured to periodically poll the machines to receive the messages.

5. The system of claim 4, wherein the processor is configured to receive the messages from only those of the machines having the validators that assessed one or more of the payment tokens since a previous polling of the machines.

6. The system of claim 4, wherein the processor is configured to determine times of receipt for the messages transmitted from the machines during a first polling cycle, the processor configured to make the times of receipt for the messages received during the first polling cycle as equivalent to a time at which the first polling cycle begins regardless of when the messages are actually received by the processor.

7. The system of claim 1, wherein the machines are gaming machines that receive the payment tokens in order to allow players to play games at the machines.

8. A system comprising:
an input device configured to receive messages from plural machines having validators that assess payment tokens, the messages indicative of at least one of acceptance or rejection of the payment tokens; and a processor configured to identify a walk-away event at a first machine of the machines when a first validator at the first machine rejects a first payment token and at least a threshold time period expires following this rejection without the first validator accepting or rejecting a second payment token, the processor also configured to request servicing of at least one of the first validator or the first machine based on the walk-away event, wherein the processor is configured to periodically poll the machines to receive the messages.

9. The system of claim 8, wherein the processor is configured to request servicing of one or more of the validators or the machines according to a priority that is based on walk-away events identified at the machines.

10. The system of claim 8, wherein the processor is configured to identify the walk-away event when a number of assessments of the payment tokens at the first machine resulting in rejection of the payment tokens exceed a designated threshold.

11. The system of claim 8, wherein the messages received from the machines identify which of the machines transmitted the messages.

12. The system of claim 8, wherein the processor is configured to receive the messages from only those of the machines having the validators that assessed one or more of the payment tokens since a previous polling of the machines.

13. The system of claim 8, wherein the processor is configured to determine times of receipt for the messages transmitted from the machines during a first polling cycle, the processor configured to make the times of receipt for the messages received during the first polling cycle as equivalent to a time at which the first polling cycle begins regardless of when the messages are actually received by the processor.

14. The system of claim 8, wherein the machines are gaming machines that receive the payment tokens in order to allow players to play games at the machines.

* * * * *